Dec. 23, 1969     G. B. GREENE     3,485,258
BISTABLE FLUID DEVICE
Filed April 14, 1966
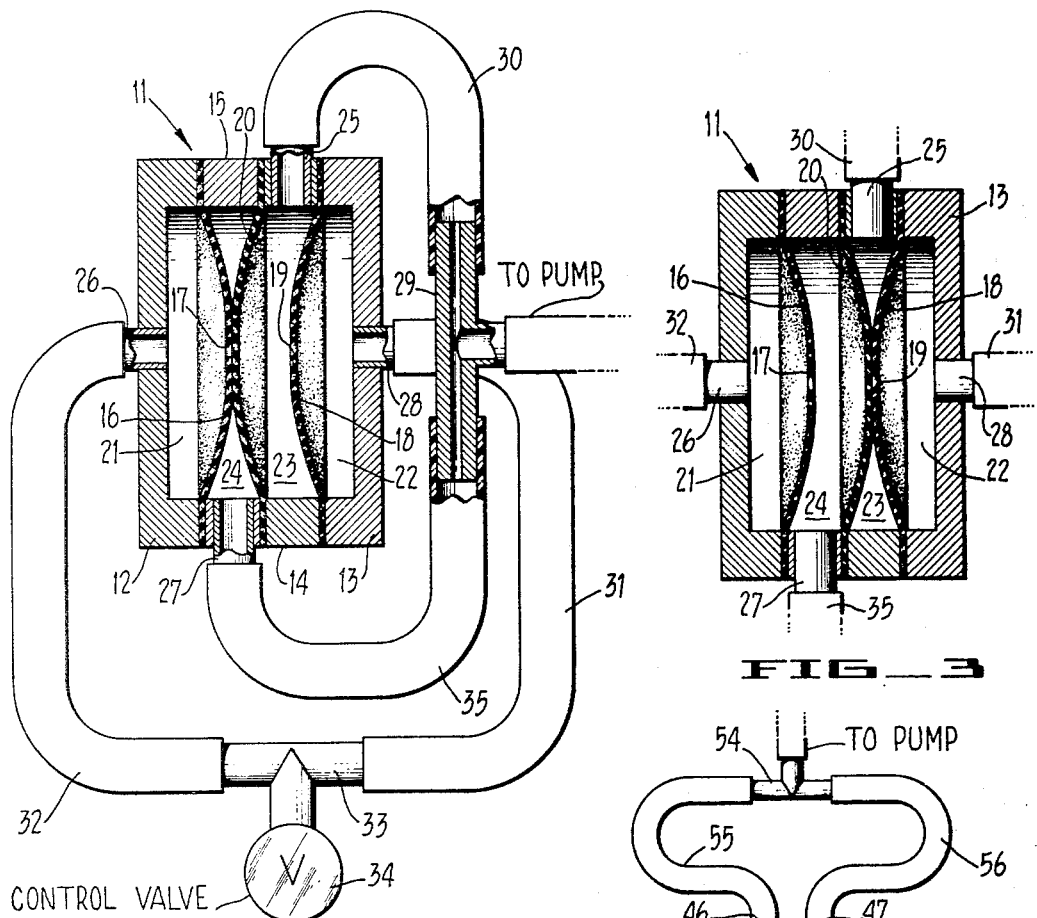
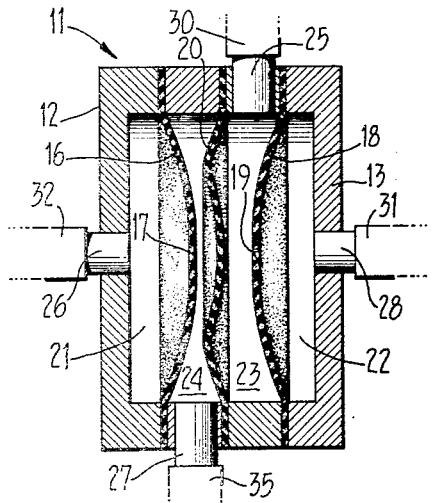
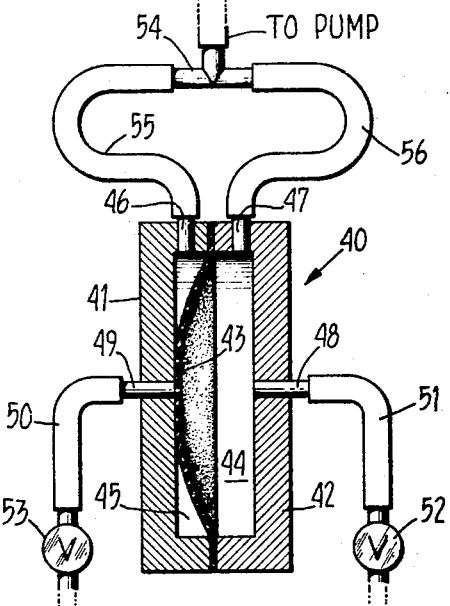
GEORGE B. GREENE
INVENTOR.
BY *Charles R. [signature]*
ATTORNEY United States Patent Office 3,485,258
Patented Dec. 23, 1969

3,485,258
BISTABLE FLUID DEVICE
George B. Greene, Lafayette, Calif., assignor of ninety percent to Greene Engineering Company and ten percent to Electronic Engineering Company of California, both corporations
Filed Apr. 14, 1966, Ser. No. 542,497
Int. Cl. G05d *11/02;* F16k *17/00, 31/165*
U.S. Cl. 137—112
13 Claims

ABSTRACT OF THE DISCLOSURE

A bistable device for storing information in fluidic computing and control devices. An airtight chamber is subdivided into two subchambers by a flexible partition which can be inflated to contact a first part of the wall of either of the subchambers, but cannot be brought into contact with a second part of the wall of either of the subchambers. Each subchamber is provided with fluid access means in the first part of its wall and another fluid access means in the second part of its wall. The walls of the subchambers contacted by the partition may be flexible diaphragms containing apertures which fall within the parts of the subchamber walls contacted by the inflated partition.

Background of the invention

This invention relates to fluid logic devices and more particularly to a bistable fluid device.

Fluid devices are being increasingly utilized in the design of fluid logic and computation systems and apparatus, at least in part, due to their compatibility with electronic devices. In my copending application entitled "Check Valve," Ser. No. 517,534, filed Dec. 30, 1965, I have described a fluid device which is the functional equivalent of an electronic diode, and in my copending application entitled "Controlled Fluid Valve," Ser. No. 542,583 filed Apr. 13, 1966, I have described a fluid device which is the fuctional equivalent of an electronic triode. The teachings of these two patent applications are incorporated herein by reference. These fluid devices can be readily intercoupled to fabricate various fluid logic and computation apparatus. However, a fluid device closely analogous to a magnetic core for performing various functions, such as memory or storage, would be a valuable additional tool that would provide added flexibility and versatility in the design of fluid logic and computation apparatus.

Many of the prior art fluid devices having movable valve members utilize resilient valve restoring means to close the valve by pressing the valve member against a valve seat. Overcoming such high closing forces in opening such valves, however, requires undesirably large valve actuation energies. Further, it has been the practice in the prior art to initially overstress such resilient restoring means in order to insure operation of the device after the resilient member has relaxed due to fatigue. This overstress, however, results in the disadvantages of increasing valve operating time and the necessity of relatively high actuation energies during the early life of the device. Also, some prior art fluid devices utilize gravitational force to restore a valve member which necessitates vertical orientation of the valve member for proper operation of the device. In addition, many prior art fluid devices employ separately fabricated parts which must be assembled in critically interfitting relation, thereby making them relatively expensive to fabricate.

Summary of the invention

Accordingly, one object of this invention is to provide a fluid bistable device.

Another object of this invention is to provide a fluid bistable device which is closely analogous to a magnetic core.

Another object of the present invention is to provide a fluid bistable memory device.

Another object of this invention is to provide a fluid bistable device in which critical interfitting of a movable valve member with valve seat members is unnecessary.

Another object of the present invention is to provide a fluid bistable device having a movable valve member which does not require the use of gravitational force or a resilient restoring member.

Still another object of the present invention is to provide a fluid bistable device having a movable valve member having two stable states and which maintains itself in one of said two stable states until forced into the other stable state by fluid pressure.

A further object of this invention is to provide a bistable fluid valve which can be economically and readily fabricated.

A still further object of this invention is to provide a fluid bistable device characterized by high speed of operation.

Briefly described, these and other objects, advantages, and features of the present invention are accomplished by a bistable fluid device which comprises a chamber subdivided by a movable valve partition into a first and a second subchamber. A pair of fluid access means communicate with the said first subchamber and a pair of fluid access means communicate with said second subchamber. One of the said fluid access means in each of the said subchambers functions as a valve seat means for said movable valve partition and has a fluid flow impedance that prevents immediate equalization of a pressure differential which may exist across the access means. The movable valve partition is adapted to be brought into contact with alternate ones of said valve seat means in response to fluid pressure applied to the bistable device to provide two stable states or conditions.

Brief description of the drawings

These and other features of the present invention will be more clearly and fully understood from consideration of the following detailed description taken in conjunction with the accompanying drawings in which like reference characters designate like or corresponding parts throughout the several views and wherein:

FIG. 1 is a partial cross-sectional view of one embodiment of the present invention which shows a fluid bistable device in one of its two stable states;

FIG. 2 is a cross-sectional illustration of the device of FIG. 1 which shows the bistable fluid device being switched from one stable state to the other stable state;

FIG. 3 is a view similar to FIG. 2 which shows the fluid bistable device in its other stable state; and FIG. 4 is a partial cross-sectional view of another embodiment of the present invention which shows a fluid bistable device in one of its two stable states.

Description of the preferred embodiments

Referring now to FIG. 1, there is shown a chamber formed by a housing 11 which includes two circular end plates 12 and 13 having two adjacent annular rings 14 and 15 located intermediate therebetween. A flexible circular diaphragm 16 has its outer circumferential end portion sealed in pressure-tight relationship between the end plate 12 and the ring 15. Another flexible diaphragm 18 has its outer circumferential end portion sealed in pressure-tight relationship between the other end plate 13 and the other ring 14. A flexible valve partition 20 has its outer circumferential end portion sealed in pressure-tight relationship between the two rings 14 and 15.

The end plate 12 and the flexible diaphragm 16 define an outer chamber 21 whereas the end plate 13 and the flexible diaphragm 18 define another outer chamber 22. The ring 15, the flexible diaphragm 16, and the flexible valve partition 20 define one subchamber 24, whereas the ring 14, the flexible diaphragm 18 and the flexible valve partition 20 define another subchamber 23.

The flexible diaphragm 16 includes venting or fluid access means, such as the aperture or port 17, which permits communication between the outer chamber 21 and the subchamber 24. Likewise, the flexible diaphragm 18 contains venting or fluid access means, such as an aperture or port 19, which permits communication between the outer chamber 22 and the subchamber 23. These apertures or ports 17 and 19 are small enough to present a sufficient impedance to fluid flow that prevents immediate equalization of a pressure differential which may exist across their respective flexible diaphragms 16 and 18. The flexible diaphragms 16 and 18 are preformed to have a spherical surface and are mounted within the housing, as illustrated in FIG. 1. The flexible valve partition 20 is also preformed to have a surface characterized as being a spherical section and is mounted within the housing such that the flexible partition barely "kisses" or touches the flexible diaphragm 18 or barely touches or "kisses" the other flexible diaphragm 16, as illustrated in FIG. 1. In one embodiment of the present invention which was constructed, the flexible diaphragms 16 and 18 and the flexible valve partition 20 were constructed from an inelastic material, such as Mylar or polyethylene, having a thickness of one-half to one mil for a chamber having a diameter of about one-fourth inch. As will be described in detail hereinbelow, one stable state of the bistable apparatus illustrated in FIG. 1 is defined by the flexible partition 20 being in contact with the flexible diaphragm 16 due to fluid pressure such that no fluid flow takes place between the outer chamber 21 and the subchamber 24. The other stable position of the device is when the flexible diaphragm 20 blocks fluid flow between the outer chamber 22 and the subchamber 23 in a manner as illustrated in FIG. 3.

Fluid access means to the subchamber 24 is also provided by a conduit or pipe 27 which, together with the port or aperture 17, constitutes a pair of fluid access means communicating with the subchamber 24. Also, a conduit or pipe 25 provides fluid access means to the subchamber 23 which, together with the aperture or port 19, provides a pair of fluid access means to the subchamber 23. Fluid access means to the outer chamber 22 is provided by the conduit or pipe 28, which is located substantially coaxially with the aperture or port 19 to reduce resistance to fluid flow when fluid flow takes place between the conduit 28 and the subchamber 23. Likewise, fluid access means to the outer chamber 21 is provided by the conduit or pipe 26 which is substantially coaxial with the aperture or port 17 to provide less resistance to fluid flow when fluid flow takes place between the conduit 26 and the subchamber 24.

A fluid T-coupling joint 29 has its leg or stem coupled to a source of fluid power or pressure, such as a vacuum pump (not shown). One end of the crossbar portion of the T-coupling is coupled to the conduit 27 by way of a flexible conduit 35, such as a plastic tube, whereas the other end of the crossbar portion of the T-coupling is coupled to the conduit 25 by way of another flexible tubing 30. The crossbar portion of the fluid T-coupling joint has a reduced inner diameter which provides a constriction that presents resistance to fluid flow and is the functional equivalent of a resistor in an electronic circuit. Another fluid T-coupling joint 33, substantially identical to the T-joint 29 and also having a crossbar portion having a reduced inner diameter, has its stem coupled to a control valve 34. The other side of the control valve 34 is coupled to atmosphere, or some other reference pressure which may or may not be controlled by another fluid device (not shown). One end of the crossbar of the T-joint 33 is coupled to the conduit 28 by way of a flexible tubing 31, whereas the other end of the crossbar is coupled to the conduit 26 by way of a flexible 32.

As will be described in detail hereinbelow, the apparatus of FIG. 1 is designed such that the bistable fluid device will change to its other stable state each time the control valve 34 is closed. However, the present invention is not limited to this arrangement for, as will be described below in conjunction with FIG. 4, the apparatus of FIG. 1 may contain a fluid circuit which will cause the bistabled device to be switched to its other stable state only if it is not in the desired stable state at the time a control valve is closed. In other words, FIGS. 1 and 4 illustrate various means of utilizing the bistable device comprising the present invention. However, this invention is not limited to the uses illustrated in FIGS. 1 and 4.

Assume now that the control valve 34 of FIG. 1 is open to atmospheric or some other reference potential and that the stem or leg of the T-joint 29 is coupled to an operating vacuum pump. Fluid flows through the control valve 34, the constriction in the right side of the crossbar of the T-joint 33, the flexible conduit or tubing 31, the outer chamber 22, the aperture or port 19, the subchamber 23, the flexible conduit 30, the constriction on the upper portion of the crossbar on the T-joint 29, to the vacuum pump. Since there is a pressure drop across the constrictions in the T-joints 33 and 29, the pressure in the outer chamber 22 and the subchamber 23 is intermediate the pump pressure and the pressure seen at the control valve 34. The aperture or port 19 on the flexible diaphragm 18 prevents pressure equalization of a pressure differential existing across the diaphragm 18, so that the pressure in the outer chamber 22 exceeds the pressure in the subchamber 23. Also, since fluid flows from the outer chamber 22 into the subchamber 23 by way of the aperture or port 19, the flexible diaphragm 18 retains its spherical shape, as illustrated in FIG. 1. Since the flexible valve partition 20 blocks the aperture 17 on the flexible diaphragm 16, no fluid flow takes place between the outer chamber 21 and the subchamber 24 and, accordingly, the outer chamber 21 contains the pressure seen at the control valve 34. Further, since there is no fluid flow into the subchamber 24, this chamber is pumped out by way of the conduit 35 and is substantially at the pump pressure. As will now be apparent, the pressure in the outer chamber 21 and the subchamber 23 exceeds the pressure in the subchamber 24, which results in the flexible partition 20 and the flexible diaphragm 16 being pressed together, in a manner as illustrated in FIG. 1 such that the flexible partition contacts the flexible diaphragm adjacent the opening or aperture 17 to insure a pressure-tight seal around the aperture or port 17 which prevents fluid flow between the outer chamber 21 and the subchamber 24. As will also be apparent, the flexible diaphragm 16 is now functioning as a resilient seat for the flexible valve partition 20. These conditions constitute one stable state of the bistable device illustrated in FIG. 1.

The bistable fluid apparatus of FIG. 1 can be switched to its other stable state by closing the control valve 34. This causes the pump to pump out the conduit 30, the subchamber 23, the outer chamber 22, and the conduit 31; thereby, causing the pressure in the subchamber 23 and the outer chamber 22 to approach the pump pressure, which is the pressure which exists in the other subchamber 24. Since no relatively direct fluid path (i.e., via port 17, subchamber 24, conduit 35, and T-joint 29) is yet available from the outer chamber 21, this chamber is still nearly the pressure to which the control valve was previously opened. That is to say, outer chamber 21 is connected to the pump via both constrictions of T-joint 33. This causes the pressure on the left side of the flexible partition 20 at the aperture or port 17 to be much greater than the pressure on the right side of the flexible valve partition which repels the flexible valve partition to the right at least to the extent of a considerable leak. This leak causes fluid flow from the outer chamber 21, through the subchamber 24, the conduit 35 to the pump and results in a momentary high pressure in the subchamber 24 Since subchambers 23 and 24 are connected to the pump through equal impedances (T-joint 29), the pressure in subchamber 24 will remain higher than that in subchamber 23, which causes the flexible valve partition to be further thrust or impelled to the right, as illustrated by FIG. 2, until the flexible valve partition 20 is turned inside out, as illustrated by FIG. 3, at which time is either blocks the opening or aperture 19 on the flexible diaphragm 18 or is in very close proximity thereto. A bistable partition 20 will now remain in its "inside out" state, while a baggy partition 20 should be used in a system in which valve 34 is reopened before the pressure differential between subchambers 23 and 24 is dissipated by the pumping down of chamber 24. In either case, the reopening of the control valve 34 permits fluid flow to take place from the control valve 34 through the conduit 32, the outer chamber 21, the port or aperture 17, the subchamber 24, the conduit 35, to the pump, thereby causing the pressure in the subchamber 24 and the outer chamber 21 to be intermediate the pump pressure and the pressure at the control valve 34. If the aperture 19 in the flexible diaphragm 18 is not completely blocked by the flexible valve partition 20, fluid will flow between the valve 34 and the pump by way of the outer chamber 22 and the subchamber 23. However, since the valve partition 20 is now closely adjacent the flexible diaphragm 19 and the flow therebetween is laminar, a venturi effect takes place which causes the pressure within the subchamber 23 adjacent the port 19 to be less than the pressure in the subchamber 23 at its circumferential end portion. That is, a radial pressure gradient extends radially outwardly from the port 19 within the subchamber 23. This causes the flexible valve partition 20 and the perforated flexible diaphragm 18 to be drawn together which increases the venturi effect until the aperture or port 19 is substantially sealed. With little or no flow now between the outer chamber 22 and the subchamber 23, the outer chamber pressure approaches the pressure seen at the valve 34 and the subchamber 23 is substantially at the pump pressure which further presses the valve 20 and diaphragm 18 together to insure that the port 19 is sealed with the perforated diaphragm 18 now serving as a resilient seat member for the flexible valve partition 20, as illustrated by FIG. 3. The bistable device is now in its other stable state with fluid flow and fluid pressures being opposite to those which existed in its other stable state illustrated by FIG. 1. The fluid bistable device will remain in this stable state until the control valve is again momentarily closed, at which time the process described above will cause the bistable device to switch to its other stable state.

As described above, various fluid pressures exist in the subchambers, outer chambers, and conduits for each of the two stable positions of the fluid bistable device illustrated in FIGS. 1, 2 and 3. Accordingly, the state or condition of the bistable device may readily be detected or utilized by output devices coupled to the appropriate subchambers, outer chambers, conduits, etc. Also, output or sensing devices may be coupled across various outer chambers, subchambers, or conduits to sense the condition of the bistable device or have its condition actuate other fluid devices or mechanisms.

The stem of the T-coupling joint 29 may be coupled to a steady state or pulsating vacuum pump. If pulsating, the pump may be utilized to synchronize the operation of various intercoupled fluid devices and the control valve 34 would be closed at a time during which the pulsating pump is activated.

As described above, the movable valve partition 20 may be fabricated from an inelastic material, such as Mylar or polyethylene, and is preformed into a spherical surface. Such a valve partition has two stable states— one being when it is in its natural shape, as illustrated by FIG. 1, and the other being when it is turned inside out, as illustrated by FIG. 3. Accordingly, the movable valve partition will maintain itself closely adjacent the perforate ddiaphragm valve seat it was last thrust near until forced into proximity with the other perforated diaphragm valve seat by fluid pressure applied to the bistable device. That is, the movable valve partition 20 will remain in its position even though power is cut off or lost and will not switch to its other stable state until fluid power is restored and the control valve 34 momentarily closed. The movable valve partition 20 can also be fabricated from a relatively stiff material characterized as having an "oil can" or toggle action. This can be accomplished in several ways, such as by convoluting the circumferenial portion of the movable valve partition 20 adjacent the rings 14 and 15. The movable valve partition 20 can also be fabricated from a baggy flexible material. However, when such a material is used, the bistable device cannot remember the last state into which it was switched for when fluid pressure is lost or turned off, the baggy valve partition will no longer remain in proximity with the perforated diaphragm with which it was in contact but, rather, will assume a position intermediate the two perforated diaphragm valve seat members 16 and 18.

As will now be apparent, the fluid device illustrated in FIGS. 1, 2 and 3 has two stable conditions and is, therefore, bistable and is analogous to an electronic flip-flop. By properly choosing the material from which the movable valve partition 20 is fabricated, the bistable fluid device can also remember the last stable state into which it was placed and is, therefore, a memory element analogous to a magnetic core. Also, the perforated diaphragms 16 and 18 serve as resilient seat members for the movable partition 20. Further, the operation of the bistable device does not require the use of gravitational force or resilient restoring means and, due to the small weight and inertia of the valve partition 20, the fluid bistable device may be operated at relatively high speeds. In addition, as shown by FIGS. 1, 2 and 3, the construction of the bistable device is relatively simple, making it economical to fabricate.

In the embodiment described above a negative fluid pressure source, such as a vacuum pump, is utilized. However, a positive fluid pressure source can also be used with the device of FIGS. 1, 2, and 3 by interchanging the positions of the power source and the control valve 34.

FIG. 4 illustrates another embodiment of the present invention wherein the outer chambers 21 and 22 discussed hereinabove in conjunction with FIGS. 1, 2 and 3 are eliminated. This is accomplished in effect, by substituting perforated end plate portions 41 and 42 for the perforated diaphragms 16 and 18 discussed above. As shown by FIG. 4, this embodiment comprises a chamber which is formed by a housing 40 which comprises the two circular end plate portions 41 and 42, respectively. The chamber is divided into two subchambers 44 and 45 by a flexible movable valve partition 43 which has its outer circumferential end portion sealed in pressure-tight relationship between the two end plate portions 41 and 42. This flexible movable valve partition 43 is substantially identical to the movable valve partition 20 discussed above. Fluid access means communicating with the subchamber 44 is provided by a conduit 47 which is coupled, by way of a flexible tubing 56, to one end of the crossbar of a T-coupling 54 which is substantially identical to the T-couplings 33 and 29 described above. Fluid access means communicating wth the subchamber 45 is provided by a conduit 46 which is coupled to the other end of the T-coupling 54 crossbar, by way of a flexible conduit 55. The stem or base of the T-coupling 54 is coupled to a fluid power source, such as a vacuum pump (not shown). Additional fluid access means communicating with the subchambers 44 and 45 are provided by the conduits 48 and 49, respectively. The conduit or pipe 49 is coupled to a control valve 53 by the conduit 50, which may be flexible tubing, with the other side of the control valve being coupled to atmospheric or a reference potential. The conduit 48 is coupled by way of a flexible conduit 51, such as plastic tubing, to another control valve 52, the other side of which is open to atmospheric pressure or some reference pressure. The inside diameter of the conduits 48 and 49 is such that they present an impedance to fluid flow sufficient to prevent immediate pressure equalization of a pressure differential which may exist between their associated subchambers 44 and 45 and the flexible fluid conduits 50 and 51, respectively.

The bistable apparatus of FIG. 4 is operated by momentarily closing one of the control valves 52 or 53. Such momentary closing of one of the control valves will cause the bistable device, in a manner as described below, to switch to the other of its stable states only if it is not already in the stable state induced by closing the particular control valve. In the device illustrated in FIGS. 1 through 3, however, the bistable device is switched each time the control valve 34 is momentarily closed. It is to be understood that the use of two control valves or the use of a single control valve is arbitrary with the designer and is determined by the desired circuit characteristics and that the device illustrated in FIG. 4 is not limited to the use of two control valves 52 and 53 and that the device illustrated in FIGS. 1 through 3 is not limited to the use of a single control valve 34 inasmuch as the external fluid circuit of FIG. 1 may be substituted for the external fluid circuit of the fluid device illustrated in FIG. 4 and vice versa. Also, in view of the description contained herein, other external fluid circuits (not shown) may be utilized with the devices illustrated in FIGS. 1 through 4.

Assume now that the two control valves 52 and 53 are open and that the flexible partition 43 is to the left, as illustrated in FIG. 4, thereby blocking the conduit 49 to prevent fluid flow from the control valve 53 into the subchamber 45. This causes the subchamber 45 to be pumped down to approximately the pump pressure by way of the conduit 55. Also, since the conduit 48 is not blocked, fluid will flow through the control valve 52, the conduit 51, the subchamber 44, the conduit 56, to the vacuum pump. The pressure in the subchamber 44 will be the pressure seen at the control valve 52 and since this pressure exceeds the pressure in the other subchamber 45, the valve partition 43 is forced against the end plate portion 41 such that the valve partition creates a pressure-tight seal with the end plate portion at an area adjacent the end of the conduit 49 which insures that no fluid flow takes place between the control valve 53 and the subchamber 45. Assume now that the control valve 53 is momentarily closed, since no fluid flow exists between the control valve 53 and the subchamber 45, closing of this control valve does not switch the bistable device. However, assume now that the control valve 53 is open and the other control valve 52 is momentarily closed. This causes the vacuum pump to pump out the subchamber 44 by way of the conduit 56 causing the pressure in the subchamber to approach the pump pressure. Since atmospheric, or a reference pressure, exists in the conduits 50 and 49, the area of the valve partition adjacent the conduit 49 is forced slightly to the right, causing the pressure-tight seal around the end of the conduit 49 to be broken. When this seal is broken, fluid flow takes place through the control valve 53, the conduits 50 and 49, the subchamber 45, the conduit 55, to the vacuum pump. This causes the pressure in the subchamber 45 to suddenly increase. This sets up a pressure differential between the subchambers 45 and 44 which thrusts or impels the movable valve partition 43 to the right in a manner as discussed above in conjunction with FIGS. 1 through 3.

When the valve 52 is again opened, the conduit 48 will become blocked by the valve partition 43 in a manner as described above, thereby causing the subchamber 44 to be pumped to approximately the pump pressure, whereas fluid flow will take place between the control valve 53 and the pump which will now cause the pressure in the subchamber 45 to be greater than the pressure in the subchamber 44 which insures that the valve partition creates a pressure-tight seal around the end of the conduit 48. In a manner as described above, again momentarily closing the control valve 52 will not cause the valve partition to return to the left, however, momentarily closing the control valve 53 will do so.

In the device illustrated in FIGS. 1 through 3, the aperture or port of the flexible diaphragms 16 and 18 were blocked or sealed by fluid pressure causing the valve partition 20 and a perforated diaphragm to be pressed together in such a manner that a pressure-tight seal is obtained around the aperture or port. In the device of FIG. 4, however, the conduits 48 and 49 are blocked by the preformed valve partition 43 being brought into contact by fluid pressure against the flat interior wall of the end plate portions 41 or 42 adjacent the conduits 49 or 48 to create a pressure-tight seal therearound so as to prevent fluid flow from a conduit into the associated subchamber. To insure that the valve partition pressure seals an area completely surrounding the end of the conduits 48 and 49 on the flat inner surface of the end portions 42 and 41, the conduits 48 and 49 are located coaxially with the apex or peak of the preformed valve partition 43. In a manner similar to the perforated diaphragms 16 and 18 of FIGS. 1 through 3, the inner surface of the end plate portions 41 and 42 of FIG. 4 function as a valve seat for the valve partition 43. However, unlike the perforated flexible diaphragms of FIGS. 1 through 3, the end plates 41 and 42 of FIG. 4 do not constitute resilient valve seat members.

What has been described is a bistable fluid device which is closely analogous to an electronic flip-flop and which is capable of functioning as a memory device. This is accomplished in a fluid device having a movable valve partition which does not require the use of a resilient restoring member or gravitational force for its operation.

As will be apparent to those skilled in the art, many modifications and variations of the present invention are possible in light of the above-detailed description. It is to be understood, therefore, that within the scope of the following claims, this invention may be practiced otherwise than as specifically described.

What I claim is:

1. A fluid device comprising: a chamber subdivided by a movable valve partition into a first and a second subchamber, said movable valve partition having an outer rim and being so constructed and arranged that when it is unstressed by pressure differentials its center lies outside the plane of its rim, a pair of fluid access means communicating with said first subchamber, a pair of fluid access means communicating with said second subchamber, one of said fluid access means in each of said subchambers functionining as valve seat means for said movable valve partition, said movable valve partition being adapted to be brought into contact with alternate ones of said fluid access means functioning as valve seat means in response to fluid pressure, the other one of said fluid access means in each of said subchambers passing through a portion of the wall of its subchamber which is not contacted by said movable valve partition when said movable valve partition is brought into contact with the one of said fluid access means functioning as valve seat means.

2. A fluid device according to claim 1 wherein said movable valve partition is baggy.

3. A fluid device according to claim 1 wherein said movable valve partition is nonelastic.

4. A fluid device according to claim 1, wherein said movable valve partition comprises inelastic material preformed into a spherical surface.

5. A fluid device according to claim 1, wherein said movable valve partition maintains itself in contact with one of said fluid access means functioning as valve seat means until forced into contact with the other of said fluid access means functioning as valve seat means by fluid pressure applied to said bistale device.

6. A fluid device comprising: a chamber subdivided by a movable valve partition into a first and a second subchamber, a pair of fluid access means communicating with said first subchamber, a pair of fluid access means communicating with said second subchamber, one of said fluid access means in each of said subchambers functioning as valve seat means for said movable valve partition, said movable valve partition being adapted to be brought into contact with alternate ones of said fluid access means functioning as valve seat means in response to fluid pressure, the other one of said fluid access means in each of said subchambers passing through a portion of the wall of its subchamber which is not contacted by said movable valve partition when said movable valve partition is brought into contact with the one of said fluid access means functioning as valve seat means, each of said fluid access means functioning as valve seat means for said movable valve partition including a flexible diaphragm having an opening adapted to be blocked by said movable valve partition when said partition is in contact with said diaphragm.

7. A fluid device according to claim 6, wherein each of said flexible diaphragms is preformed into a spherical surface.

8. A fluid device according to claim 6 further including first and second outer chambers, one of said diaphragms having its opening communicating between one of said subchambers and one of said outer chambers, the other one of said diaphragms having its opening communicating between the other one of said subchambers and the other one of said outer chambers.

9. A fluid device according to claim 1, wherein each of said fluid access means functioning as valve seat means for said movable valve partition includes an opening in a wall of one of said subchambers, each of said openings being adapted to be blocked by said movable valve partition when said partition is in contact with the associated valve seating means.

10. A fluid device comprising: a chamber subdivided by a movable valve partition into a first and a second subchamber, a pair of fluid access means communicating with said first subchamber, a pair of fluid access means communicating with said second subchamber, one of said fluid access means in each of said subchambers functioning as valve seat means for said movable valve partition, said movable valve partition being adapted to be brought into contact with alternate ones of said fluid access means functioning as valve seat means in response to fluid pressure, the other one of said fluid access means in each of said subchambers passing through a portion of the wall of its subchamber which is not contacted by said movable valve partition when said movable valve partition is brought into contact with the one of said fluid access means functioning as valve seat means, a valve, first fluid conducting means including a constriction coupled between said valve and one of said fluid access means functioning as valve seat means, and second fluid conducting means including a constriction coupled between said valve and the other one of said fluid access means functioning as valve seat means.

11. A fluid device according to claim 10 in which each of the remainder of said fluid access means is coupled through a constriction to a source of fluid power.

12. A fluid device according to claim 1 further comprising a first valve, one of said fluid access means functioning as valve seat means being coupled through a constriction to said first valve, and a second valve, the other of said fluid access means functioning as valve seat means being coupled through a constriction to said second valve.

13. A fluid device according to claim 12 in which each of the remainder of said fluid access means is coupled through a constriction to a source of fluid power.

References Cited

UNITED STATES PATENTS

| | | | |
|---|---|---|---|
| 2,545,857 | 3/1951 | Perkins | 92—98 XR |
| 3,252,481 | 5/1966 | Meier | 251—331 XR |
| 2,930,391 | 3/1960 | Bass. | |
| 3,011,758 | 12/1961 | McFarland | 251—368 X |
| Re. 25,211 | 7/1962 | Fellberg | 137—525 X |
| 3,301,282 | 1/1967 | Fresolone | 188—152.14 X |

FOREIGN PATENTS

| | | |
|---|---|---|
| 137,439 | 1/1951 | Sweden. |
| 934,603 | 8/1963 | Great Britain. |

WILLIAM F. O'DEA, Primary Examiner

HOWARD M. COHN, Assistant Examiner

U.S. Cl. X.R.

92—98; 137—525; 251—61.1